United States Patent
Wesolowski et al.

(10) Patent No.: US 9,950,604 B2
(45) Date of Patent: Apr. 24, 2018

(54) DEVICE AND METHOD FOR SYNCHRONIZING A FLYWHEEL WITH A DRIVETRAIN

(71) Applicant: Dana Limited, Maumee, OH (US)

(72) Inventors: Steven J. Wesolowski, Waterville, OH (US); Donald J. Remboski, Ann Arbor, MI (US); Timothy J. Morscheck, Portage, MI (US); Mark R. J. Versteyhe, Oostkamp (BE); Mathieu Dutré, Sint-Niklaas (BE)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 15/450,637

(22) Filed: Mar. 6, 2017

(65) Prior Publication Data

US 2017/0174066 A1 Jun. 22, 2017

Related U.S. Application Data

(63) Continuation of application No. 13/649,239, filed on Oct. 11, 2012, now Pat. No. 9,623,743.

(60) Provisional application No. 61/545,825, filed on Oct. 11, 2011.

(51) Int. Cl.
| | |
|---|---|
| *B60K 6/10* | (2006.01) |
| *B60W 10/24* | (2006.01) |
| *B60W 20/40* | (2016.01) |
| *F16H 3/54* | (2006.01) |

(52) U.S. Cl.
CPC ............ *B60K 6/105* (2013.01); *B60W 10/24* (2013.01); *B60W 20/40* (2013.01); *B60W 2510/24* (2013.01); *B60W 2710/1005* (2013.01); *B60W 2710/24* (2013.01); *B60Y 2400/162* (2013.01); *F16H 3/54* (2013.01); *F16H 2200/2005* (2013.01); *F16H 2200/2035* (2013.01)

(58) Field of Classification Search
CPC .............................. B60K 6/105; B60W 10/24
See application file for complete search history.

(56) References Cited

U.S. PATENT DOCUMENTS

| | | | |
|---|---|---|---|
| 4,588,040 A * | 5/1986 | Albright, Jr. .......... | B60K 6/105 180/165 |
| 5,755,303 A | 5/1998 | Yamamoto et al. | |
| 7,178,618 B2 | 2/2007 | Komeda et al. | |

(Continued)

FOREIGN PATENT DOCUMENTS

| | | |
|---|---|---|
| GB | 2463136 A | 3/2010 |
| WO | 2005118323 A1 | 12/2005 |
| WO | 2011082764 A1 | 7/2011 |

*Primary Examiner* — Derek D Knight
(74) *Attorney, Agent, or Firm* — Marshall & Melhorn, LLC

(57) ABSTRACT

A vehicle driveline and a method for synchronizing a flywheel and the vehicle driveline are provided. The vehicle driveline includes a power source, a primary clutch drivingly engaged with the power source, a primary transmission drivingly engaged with the primary clutch, a secondary transmission drivingly engaged with one of a portion of the primary clutch and an input of the primary transmission, a controller in communication with the secondary transmission, and a flywheel drivingly engaged with the secondary transmission. The vehicle driveline facilitates a transfer of energy to and from the flywheel based on at least one of a state of charge of the flywheel, a power requirement of the vehicle driveline, and a state of operation of the power source.

13 Claims, 4 Drawing Sheets

(56) References Cited

U.S. PATENT DOCUMENTS

| | | |
|---|---|---|
| 7,540,346 B2 | 6/2009 | Hu |
| 7,637,836 B2 | 12/2009 | Watanabe et al. |
| 8,142,329 B2 | 3/2012 | Ortmann |
| 8,180,511 B2 | 5/2012 | Bowman et al. |
| 2010/0152982 A1 | 6/2010 | Bowman et al. |
| 2010/0192708 A1 | 8/2010 | Kees et al. |
| 2010/0193273 A1 | 8/2010 | Jones, Jr. |
| 2012/0028752 A1 | 2/2012 | Van Druten et al. |

\* cited by examiner

DEVICE AND METHOD FOR SYNCHRONIZING A FLYWHEEL WITH A DRIVETRAIN

BACKGROUND

There is a rising demand to increase fuel economy in a wide range of vehicles, including passenger vehicles, commercial vehicles, such as tractor trailers, and off-highway vehicles, such as mining and construction equipment. One of the ways to increase fuel economy is to reduce the size of the engine for any gasoline powered vehicle. Of course, if the engine size is reduced, available power is also reduced unless a supplemental power source for high or increased power demands can be selectively engaged.

Selective engagement opportunities might be during high power demands, such as when the vehicle is going up a grade, passing, starting or other working conditions. A supplemental power source permits an internal combustion engine to be reduced in size so that it can still handle a wide range of power needs of the vehicle, but the internal combustion engine need not be sized to meet every possible need. Instead, the supplemental power source may be used to selectively add power to the vehicle at high demand times. It may also be permissible or desirable for the supplemental power source to recover energy from the vehicle and then use that recovered energy to power the source as well as the vehicle.

One possible supplemental power source for vehicles may be such as a mechanical flywheel. Flywheel energy storage systems work by accelerating a rotor or disc to very high speeds via an external device, such as an internal combustion engine, an electromagnet, or an axle. The available kinetic energy in the system can be transferred into rotational mechanical energy, thus providing a power source to the driveline. The rotating flywheel can also be used as a power sink during braking. When energy is extracted from the flywheel, a rotational speed of the flywheel is reduced as a consequence of the principle of conservation of energy; adding energy to the flywheel correspondingly results in an increase in the speed of the flywheel.

In one example, a flywheel energy storage system can be connected to the front or rear axle of a vehicle. During periods of deceleration, braking energy is used to speed up the flywheel (up to about 60,000 revolutions per minute, for example). When the vehicle accelerates, the rotational energy from the flywheel is transferred to mechanical energy to the driving wheels of the vehicle via a specially designed device, like a continuously variable transmission, for example.

A known driveline layout for a vehicle driveline 100 equipped with a flywheel 102 is depicted in FIG. 1. As shown in the figure, a power source 104 (such as an internal combustion engine or an electric motor, for example) is connected to a clutch 106, which is connected to a transmission 108, which is connected to an axle 110 and a pair of wheels 112. The flywheel 102 is schematically depicted as being connected to an output 114 of the power source 104. The vehicle driveline 100 layout has several disadvantages that must be overcome.

A first disadvantage of the driveline layout shown in FIG. 1 is synchronizing a varying speed of the flywheel 102 with a varying speed of a vehicle (not shown) the vehicle driveline 100 is incorporated in. The varying speed of the flywheel 102 is dependent on an amount of energy stored therein. Accordingly, if a portion of the amount of energy stored in the flywheel is transferred to the vehicle driveline 100, a speed of the flywheel 102 drops. Each of the speeds in the vehicle driveline (a speed of the power source 104, a speed of an input 116 of the transmission 108, a speed of an output 118 of the transmission 108, for example) is related to a road speed of the vehicle. As a non-limiting example, the power source 104 may have a rotational speed that varies between about 1000 revolutions per minute and about 3000 revolutions per minute; resulting in a spread factor of about 3. The flywheel 102 may have a rotational speed that varies between about 30,000 revolutions per minute to about 60,000 revolutions per minute; resulting in a spread factor of about 2. The rotational speed of the power source 104 is linked to the road speed of the vehicle, and the flywheel 102 must be able to be drivingly engaged therewith. Therefore, a device capable of providing a total spread factor of about 6 (a spread factor of about 2 multiplied by a spread factor of about 3) would be required to drivingly engage the flywheel 102 with the vehicle driveline 100.

A second disadvantage is a difficulty in smoothly connecting the vehicle driveline 100 with the flywheel 102. If the flywheel 102 was infinitely rigidly connected to the driveline with an appropriate ratio, at a later point the ratio between the flywheel 102 and the road speed of the vehicle would not be valid anymore and the flywheel 102 would provide either too much torque or not enough torque. Further, pairing the vehicle driveline 100 and the flywheel 102 influences the rotational speed of the flywheel 102 and thus the amount of torque provided by the flywheel 102. Accordingly, for the vehicle driveline 100 to be capable of engaging the flywheel 102, the vehicle driveline 100 must permit small errors in the ratio set to occur.

It would be advantageous to develop a driveline and a method for transferring energy from a flywheel that increases a fuel efficiency of a vehicle the driveline is incorporated in, permits a primary power source to be selectively supplemented using the flywheel, and permits the flywheel to store and capture excess energy present in the driveline.

SUMMARY

A driveline and a method for transferring energy from a flywheel, that increases a fuel efficiency of a vehicle the driveline is incorporated in, permits a primary power source to be selectively supplemented using the flywheel, and permits the flywheel to store and capture excess energy present in the driveline, has surprisingly been discovered.

In one embodiment, a vehicle driveline has a power source and a primary clutch drivingly engaged with the power source. A secondary clutch is connected to the primary clutch by a drive member. A primary transmission is connected to the secondary clutch. A driveshaft that outputs to at least one axle with a wheel is connected to the primary transmission. A flywheel is connected to a secondary transmission. The secondary transmission is connected to the drive member through a planetary gear set. A control module is provided for controlling the primary clutch, secondary clutch, planetary gear set, primary transmission and secondary transmission.

A method of synchronizing a flywheel and a vehicle driveline is also disclosed herein.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
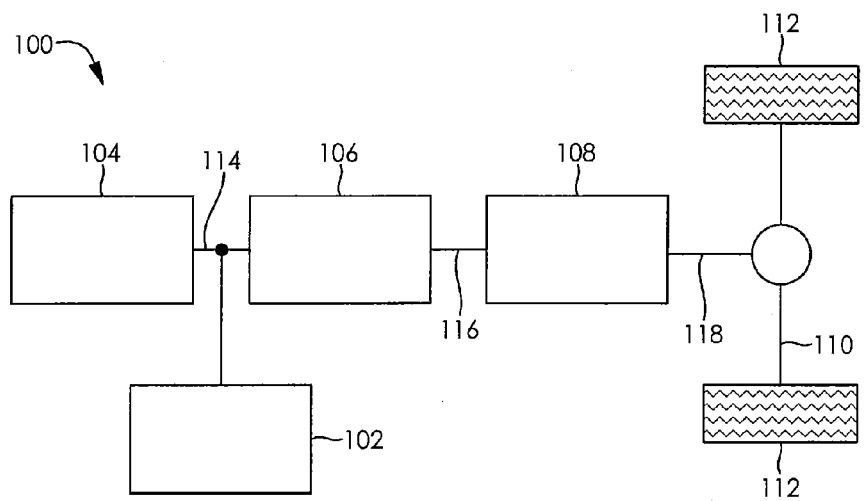
FIG. 1 is a schematic sketch of a vehicle driveline equipped with a flywheel system according to the prior art.
Figure 2:
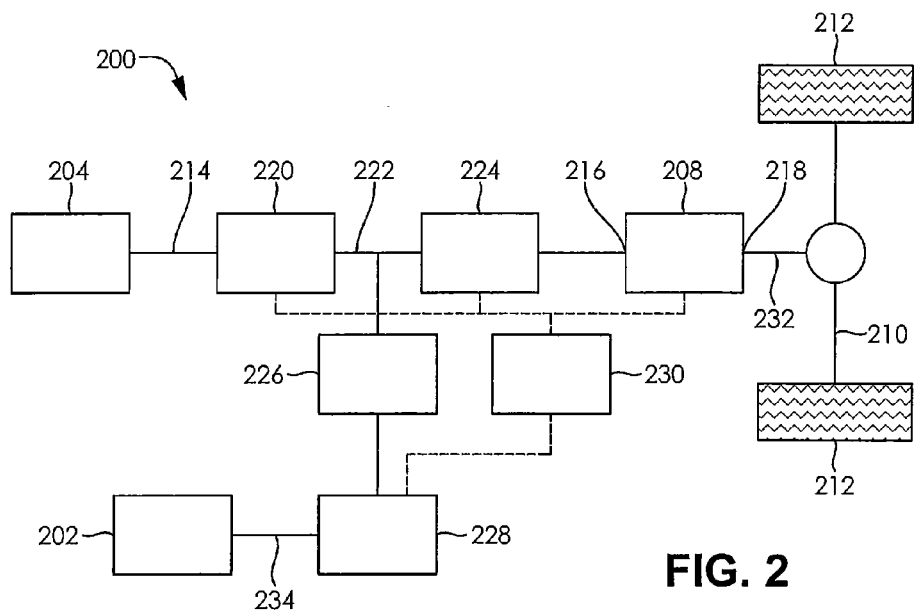
FIG. 2 is a schematic sketch of a vehicle driveline equipped with a flywheel system according to an embodiment of the invention.

FIG. 2 illustrates a vehicle driveline 200 according to an embodiment of the invention. The embodiment shown in FIG. 2 includes similar components to the vehicle driveline 100 illustrated in FIG. 1. Similar features of the embodiment shown in FIG. 2 are numbered similarly in series, with the exception of the features described below.

The vehicle driveline 200 includes a power source 204 having a power source output 214. A primary clutch 220 is drivingly engaged with the power source output 214. A drive member 222 is drivingly engaged with the primary clutch 220 and a secondary clutch 224. A primary transmission 208 is drivingly engaged with the secondary clutch 224. An axle 210 and a pair of wheels 212 are drivingly engaged with the primary transmission 208. A ratio adapter 226 is drivingly engaged with the drive member 222. A flywheel clutch 228 is drivingly engaged with the ratio adapter 226. A flywheel 202 is drivingly engaged with the flywheel clutch 228. A controller 230 is in communication with the primary clutch 220, the secondary clutch 224, the primary transmission 208, and the flywheel clutch 228.

The primary clutch 220 connects the power source output 214 and the drive member 222. A first portion (not shown) of the primary clutch 220 is drivingly engaged with the power source output 214. A second portion (not shown) of the primary clutch 220 is drivingly engaged with the drive member 222. An actuator (not shown) causes the first portion of the primary clutch 220 to become drivingly engaged with the second portion of the primary clutch 220 when directed by the controller 230. The primary clutch 220 is a friction plate style clutch; however it is understood that other styles of clutches may be used. The primary clutch 220 may be variably engaged to transfer a portion of a torque transferred through the power source output 214 to the drive member 222 or the primary clutch 220 may be variably engaged to transfer a portion of a torque transferred through the drive member 222 to the power source output 214. It is understood that a sensor (not shown) in communication with the controller 230 may be placed on or adjacent the primary clutch 220 to measure an amount of engagement thereof.

The drive member 222 is an elongate member rotatably disposed in a housing (not shown). The drive member 222 includes a first end portion, a second end portion, and a middle portion. The first end portion is drivingly engaged with the second portion of the primary clutch 220. Alternately, it is understood that the first end portion may be unitarily formed with the second portion of the primary clutch 220. The second end portion is drivingly engaged with a first portion (not shown) of the secondary clutch 224. Alternately, it is understood that the second end portion may be unitarily formed with the first portion of the secondary clutch 224. The middle portion extends radially outwardly from a remaining portion of the drive member 222 and includes a plurality of gear teeth formed thereon; however, it is understood that the drive member 222 may be engaged with the ratio adapter 226 in any other manner. The plurality of gear teeth formed on the middle portion is drivingly engaged with the ratio adapter 226. It is understood that a sensor (not shown) in communication with the controller 230 may be placed on or adjacent the drive member 222 to measure a rotational speed thereof.

The secondary clutch 224 connects the drive member 222 and the primary transmission 208. The first portion (not shown) of the secondary clutch 224 is drivingly engaged with the second end portion of the drive member 222. A second portion (not shown) of the secondary clutch 224 is drivingly engaged with the primary transmission 208. An actuator (not shown) causes the first portion of the secondary clutch 224 to become drivingly engaged with the second portion of the secondary clutch 224 when directed by the controller 230. The secondary clutch 224 is a friction plate style clutch; however it is understood that other styles of clutches may be used. The secondary clutch 224 may be variably engaged to transfer a portion of a torque transferred through the drive member 222 to the primary transmission 208 or the secondary clutch 224 may be variably engaged to transfer a portion of a torque transferred through the primary transmission 208 to the drive member 222. It is understood that a sensor (not shown) in communication with the controller 230 may be placed on or adjacent the secondary clutch 224 to measure an amount of engagement thereof.

The primary transmission 208 is a continuously variable transmission. A transmission input 216 is drivingly engaged with the second portion of the secondary clutch 224. A transmission output 218 is drivingly engaged with the axle 210 through a driveshaft 232; however, it is understood that the transmission output 218 may be drivingly engaged with the axle 210 through a gear or another device. It is understood that the primary transmission 208 may be fitted with a sensor (not shown) in communication with the controller 230. In one exemplary, non-limiting example, the primary transmission 208 is a pulley-belt style continuously variable transmission. The pulley-belt style continuously variable transmission comprises of a pair of variable-diameter pulleys, each shaped like a pair of opposing cones, with a belt running between them. The pulley-belt style continuously variable transmission is conventional and well known in the art.

A first pulley (not shown) is then connected to the transmission input 216 and a second pulley (not shown) is connected to the transmission output 218. The halves of each pulley are moveable, and as the halves of each of the pulleys are moved towards one another the belt is forced to ride higher on the pulley, effectively making a diameter of the pulley larger. Changing the diameter of the each of the pulleys varies the ratio between the transmission input 216 and the transmission output 218. Making the first pulley diameter smaller and the second pulley diameter larger gives a low ratio (a large number of revolutions of the transmission input 216 produce a small number of output revolutions of the transmission output 218). Alternately, it is understood that the primary transmission 208 may be another type of continuously variable transmission or that the primary transmission 208 may be an automatic transmission.

The ratio adapter 226 is a fixed ratio transmission device rotatably disposed in the housing. The ratio adapter 226 includes a first end portion and a second end portion. Alternately, it is understood that the ratio adapter 226 may comprise a plurality of geared members, gears, or may be any other ratio adapting device. The ratio adapter 226 is drivingly engaged with the drive member 222 and the flywheel clutch 228 and adjusts a drive ratio therebetween.

The first end portion is drivingly engaged with the middle portion of the drive member 222. The first end portion extends radially outwardly from a remaining portion of the ratio adapter 226 and includes a plurality of gear teeth formed thereon; however, it is understood that the ratio adapter 226 may be engaged with the drive member 222 in any other manner. The plurality of gear teeth formed on the first end portion is drivingly engaged with the plurality of gear teeth formed on the middle portion of the drive member 222. A gear ratio formed between the first end portion of the ratio adapter 226 and the middle portion of the drive member 222 facilitates driving engagement between the flywheel 202 and the drive member 222 when the flywheel clutch 228 is placed in an engaged position. Alternately, it is understood that the gear ratio may be provided through the use of one of a fixed ratio transmission, an automatic transmission, or a continuously variable transmission.

The second end portion is drivingly engaged with a first portion (not shown) of the flywheel clutch 228. The second end portion extends radially outwardly from a remaining portion of the ratio adapter 226 and includes a plurality of gear teeth formed thereon; however, it is understood that the ratio adapter 226 may be engaged with the first portion of the flywheel clutch 228 in any other manner. The plurality of gear teeth formed on the second end portion is drivingly engaged with the first portion of the flywheel clutch 228.

The flywheel clutch 228 connects the ratio adapter 226 and the flywheel 202. The first portion (not shown) of the flywheel clutch 228 is drivingly engaged with the second end portion of the ratio adapter 226. A second portion (not shown) of the flywheel clutch 228 is drivingly engaged with a flywheel shaft 234 of the flywheel 202. An actuator (not shown) causes the first portion of the flywheel clutch 228 to become drivingly engaged with the second portion of the flywheel clutch 228 when directed by the controller 230. The flywheel clutch 228 is a friction plate style clutch; however it is understood that other styles of clutches may be used. The flywheel clutch 228 may be variably engaged to transfer a portion of a torque transferred through the ratio adapter 226 to the flywheel 202 or the flywheel clutch 228 may be variably engaged to transfer a portion of a torque transferred through the flywheel 202 to the ratio adapter 226. It is understood that the flywheel clutch 228 may be fitted with a sensor (not shown) in communication with the controller 230. It is understood that a sensor (not shown) in communication with the controller 230 may be placed on or adjacent the flywheel clutch 228 to measure an amount of engagement thereof.

The flywheel 202 is a disc shaped or cylindrical shaped member. The flywheel 202 is rotatably disposed within a housing (not shown) and is in driving engagement with the second portion of the flywheel clutch 228. The flywheel 202 may include a reinforcement band (not shown) disposed about an outer edge of the flywheel 202. The flywheel 202 is formed by casting and machining a metal; however, it is understood that other processes and materials, such as forming the flywheel 20 from a composite, may be used. It is understood that a sensor (not shown) in communication with the controller 230 may be placed on or adjacent the flywheel 202 to measure a rotational speed thereof.

The controller 230 is in communication with the primary clutch 220, the secondary clutch 224, the primary transmission 208, and the flywheel clutch 228. Further, it is understood that the controller 230 may be in communication with a plurality of sensors (not shown). The controller 230 at least one of receives and sends signals to and from at least one of the primary clutch 220, the secondary clutch 224, the primary transmission 208, the flywheel clutch 228, and the plurality of sensors.

Figure 3:
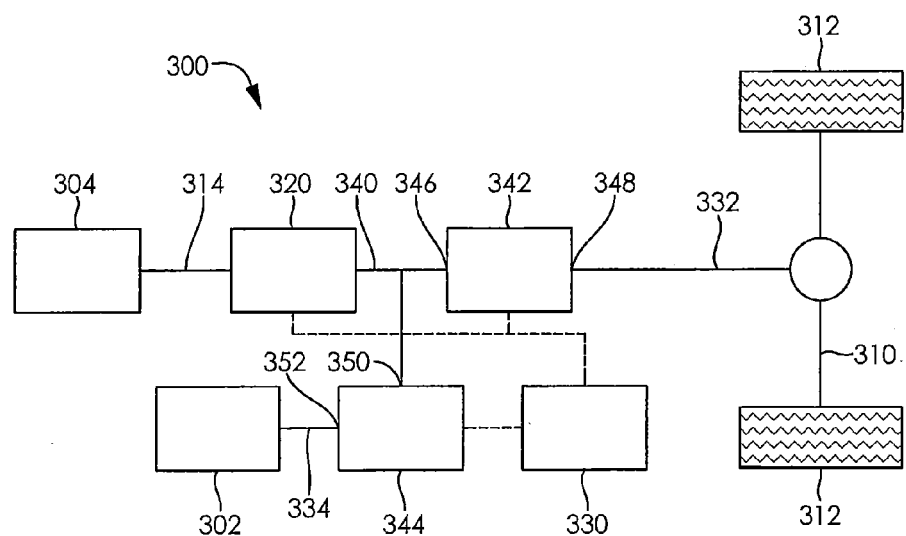
FIG. 3 is a schematic sketch of a vehicle driveline equipped with a flywheel system according to another embodiment of the invention.

FIG. 3 illustrates a vehicle driveline 300 according to another embodiment of the invention. The embodiment shown in FIG. 3 includes similar components to the vehicle driveline 200 illustrated in FIG. 2. Similar features of the embodiment shown in FIG. 3 are numbered similarly in series, with the exception of the features described below.

The vehicle driveline 300 includes a power source 304 having a power source output 314. A primary clutch 320 is drivingly engaged with the power source output 314. An intermediate member 340 is drivingly engaged with the primary clutch 320 and a primary transmission 342. An axle 310 and a pair of wheels 312 are drivingly engaged with the primary transmission 342. A secondary transmission 344 is drivingly engaged with the intermediate member 340. A flywheel 302 is drivingly engaged with the secondary transmission 344. A controller 330 is in communication with the primary clutch 320, the primary transmission 342, and the secondary transmission 344.

The intermediate member 340 is an elongate drive member rotatably disposed in a housing (not shown). The intermediate member 340 includes a first end portion, a second end portion, and a middle portion. The first end portion is drivingly engaged with the second portion of the primary clutch 320. Alternately, it is understood that the first end portion may be unitarily formed with the second portion of the primary clutch 320. The second end portion is drivingly engaged with a transmission input 346 of the primary transmission 342. Alternately, it is understood that the intermediate member 340 and the transmission input 346 may be unitarily formed. The middle portion extends radially outwardly from a remaining portion of the intermediate member 340 and includes a plurality of gear teeth formed thereon; however, it is understood that the intermediate member 340 may be engaged with the secondary transmission 344 in any other manner. The plurality of gear teeth formed on the middle portion is drivingly engaged with the secondary transmission 344. It is understood that a sensor (not shown) in communication with the controller 330 may be placed on or adjacent the intermediate member 340 to measure a rotational speed thereof.

The primary transmission 342 is an automatic transmission. The primary transmission 342 includes a torque converter (not shown); however, it is understood that the primary transmission 342 may include another type of clutching device. The transmission input 346 is drivingly engaged with the second end portion of the intermediate member 340. A transmission output 348 is drivingly engaged with the axle 310 through a driveshaft 332; however, it is understood that the transmission output 348 may be drivingly engaged with the axle 310 through a gear or another device. The primary transmission 342 is a conventional automatic transmission and is well known in the art. Alternately, the primary transmission 342 may be a continuously variable transmission. It is understood that the primary transmission 342 may be fitted with a sensor (not shown) in communication with the controller 330.

The secondary transmission 344 is an automatic transmission. The secondary transmission 344 includes a torque converter (not shown); however, it is understood that the secondary transmission 344 may include another type of clutching device. A transmission input 350 of the secondary transmission 344 is drivingly engaged with the middle portion of the intermediate member 340. A transmission output 352 is drivingly engaged with flywheel 302. The secondary transmission 344 is a conventional automatic transmission and is well known in the art. Alternately, the secondary transmission 344 may be a continuously variable transmission. Further, it is understood that a gear ratio between the secondary transmission 344 and the intermediate member 340 may be adjusted through additional gearing to facilitate driving engagement therebetween. It is understood that the secondary transmission 344 may be fitted with a sensor (not shown) in communication with the controller 330.

The controller 330 is in communication with the primary clutch 320, the primary transmission 324, and the secondary transmission 344. Further, it is understood that the controller 330 may be in communication with a plurality of sensors (not shown). The controller 330 at least one of receives and sends signals to and from at least one of the primary clutch 320, the primary transmission 324, the secondary transmission 344, and the plurality of sensors.

Based on a rotational speed of the flywheel 302 and the intermediate member 340, the controller 330 selects a gear ratio of the secondary transmission 344 that permits the flywheel 302 to be drivingly engaged with the intermediate member 340. When the controller 330 accelerates the flywheel 302, the controller 330 sequentially shifts the secondary transmission 344 to increase the rotational speed of the flywheel 302. Further, it is understood that the controller 330 may variably engage the torque converter of the secondary transmission 344 to drivingly engage the flywheel 302 and the intermediate member 340.

Figure 4:
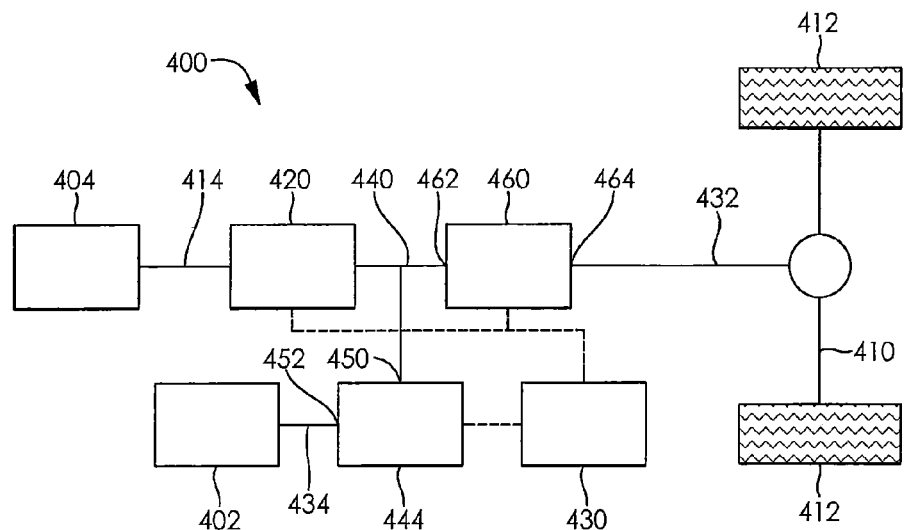
FIG. 4 is a schematic sketch of a vehicle driveline equipped with a flywheel system according to another embodiment of the invention.

FIG. 4 illustrates a vehicle driveline 400 according to another embodiment of the invention. The embodiment shown in FIG. 4 includes similar components to the vehicle driveline 200 illustrated in FIG. 2. Similar features of the embodiment shown in FIG. 4 are numbered similarly in series, with the exception of the features described below.

The vehicle driveline 400 includes a power source 404 having a power source output 414. A primary clutch 420 is drivingly engaged with the power source output 414. An intermediate member 440 is drivingly engaged with the primary clutch 420 and a primary transmission 460. An axle 410 and a pair of wheels 412 are drivingly engaged with the primary transmission 460. A secondary transmission 444 is drivingly engaged with the intermediate member 440. A flywheel 402 is drivingly engaged with the secondary transmission 444. A controller 430 is in communication with the primary clutch 420, the primary transmission 460, and the secondary transmission 444.

The intermediate member 440 is an elongate drive member rotatably disposed in a housing (not shown). The intermediate member 440 includes a first end portion, a second end portion, and a middle portion. The first end portion is drivingly engaged with the second portion of the primary clutch 420. Alternately, it is understood that the first end portion may be unitarily formed with the second portion of the primary clutch 420. The second end portion is drivingly engaged with a transmission input 462 of the primary transmission 460. Alternately, it is understood that the intermediate member 440 and the transmission input 446 may be unitarily formed. The middle portion extends radially outwardly from a remaining portion of the intermediate member 440 and includes a plurality of gear teeth formed thereon; however, it is understood that the intermediate member 440 may be engaged with the secondary transmission 444 in any other manner. The plurality of gear teeth formed on the middle portion is drivingly engaged with the secondary transmission 444. It is understood that a sensor (not shown) in communication with the controller 430 may be placed on or adjacent the intermediate member 440 to measure a rotational speed thereof.

The primary transmission 460 is a continuously variable transmission. The transmission input 462 is drivingly engaged with the second end portion of the intermediate member 440. A transmission output 464 is drivingly engaged with the axle 410 through a driveshaft 432; however, it is understood that the transmission output 464 may be drivingly engaged with the axle 410 through a gear or another device. It is understood that the primary transmission 460 may be fitted with a sensor (not shown) in communication with the controller 430. In one exemplary, non-limiting example, the primary transmission 460 is a pulley-belt style continuously variable transmission. The pulley-belt style continuously variable transmission comprises of a pair of variable-diameter pulleys, each shaped like a pair of opposing cones, with a belt running between them. The pulley-belt style continuously variable transmission is conventional and well known in the art. The primary transmission 460 facilitates greater control over a rotational speed of the power source 404 and when combined with the secondary transmission 444, facilitates reducing an amount of "slipping" of the primary clutch 420 and a torque converter (not shown) of the secondary transmission 444.

A first pulley (not shown) is then connected to the transmission input 462 and a second pulley (not shown) is connected to the transmission output 464. The halves of each pulley are moveable, and as the halves of each of the pulleys are moved towards one another the belt is forced to ride higher on the pulley, effectively making a diameter of the pulley larger. Changing the diameter of the each of the pulleys varies the ratio between the transmission input 462 and the transmission output 464. Making the first pulley diameter smaller and the second pulley diameter larger gives a low ratio (a large number of revolutions of the transmission input 462 produce a small number of output revolutions of the transmission output 464). Alternately, it is understood that the primary transmission 460 may be another type of continuously variable transmission or that the primary transmission 460 may be an automatic transmission.

The secondary transmission 444 is an automatic transmission. The secondary transmission 444 includes the torque converter; however, it is understood that the secondary transmission 444 may include another type of clutching device. A transmission input 450 of the secondary transmission 444 is drivingly engaged with the middle portion of the intermediate member 440. A transmission output 452 is drivingly engaged with flywheel 402. The secondary transmission 444 is a conventional automatic transmission and is well known in the art. Alternately, the secondary transmission 444 may be a continuously variable transmission. Further, it is understood that a gear ratio between the secondary transmission 444 and the intermediate member 440 may be adjusted through additional gearing to facilitate driving engagement therebetween. It is understood that the secondary transmission 444 may be fitted with a sensor (not shown) in communication with the controller 430.

The controller 430 is in communication with the primary clutch 420, the primary transmission 460, and the secondary transmission 444. Further, it is understood that the controller 430 may be in communication with a plurality of sensors (not shown). The controller 430 at least one of receives and sends signals to and from at least one of the primary clutch 420, the primary transmission 460, the secondary transmission 444, and the plurality of sensors.

Figure 5:
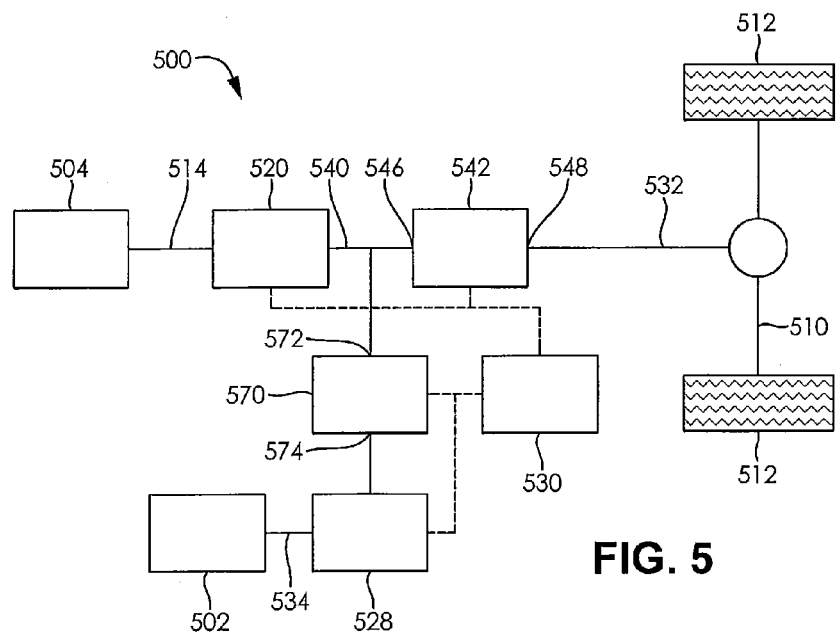
FIG. 5 is a schematic sketch of a vehicle driveline equipped with a flywheel system according to another embodiment of the invention.

FIG. 5 illustrates a vehicle driveline 500 according to another embodiment of the invention. The embodiment shown in FIG. 5 includes similar components to the vehicle driveline 200 illustrated in FIG. 2. Similar features of the embodiment shown in FIG. 5 are numbered similarly in series, with the exception of the features described below.

The vehicle driveline 500 includes a power source 504 having a power source output 514. A primary clutch 520 is drivingly engaged with the power source output 514. An intermediate member 540 is drivingly engaged with the primary clutch 520 and a primary transmission 542. An axle 510 and a pair of wheels 512 are drivingly engaged with the primary transmission 542. A secondary transmission 570 is drivingly engaged with the intermediate member 540. A flywheel clutch 528 is drivingly engaged with the secondary transmission 570. A flywheel 502 is drivingly engaged with the flywheel clutch 528. A controller 530 is in communication with the primary clutch 520, the primary transmission 542, the secondary transmission 570, and the flywheel clutch 528.

The intermediate member 540 is an elongate drive member rotatably disposed in a housing (not shown). The intermediate member 540 includes a first end portion, a second end portion, and a middle portion. The first end portion is drivingly engaged with the second portion of the primary clutch 520. Alternately, it is understood that the first end portion may be unitarily formed with the second portion of the primary clutch 520. The second end portion is drivingly engaged with a transmission input 546 of the primary transmission 542. Alternately, it is understood that the intermediate member 540 and the transmission input 546 may be unitarily formed. The middle portion extends radially outwardly from a remaining portion of the intermediate member 540 and includes a plurality of gear teeth formed thereon; however, it is understood that the intermediate member 540 may be engaged with the secondary transmission 570 in any other manner. The plurality of gear teeth formed on the middle portion is drivingly engaged with the secondary transmission 570. It is understood that a sensor (not shown) in communication with the controller 530 may be placed on or adjacent the intermediate member 540 to measure a rotational speed thereof.

The primary transmission 542 is an automatic transmission. The primary transmission 542 includes a torque converter (not shown); however, it is understood that the primary transmission 542 may include another type of clutching device. The transmission input 546 is drivingly engaged with the second end portion of the intermediate member 540. A transmission output 548 is drivingly engaged with the axle 510 through a driveshaft 532; however, it is understood that the transmission output 548 may be drivingly engaged with the axle 510 through a gear or another device. The primary transmission 542 is a conventional automatic transmission and is well known in the art. Alternately, the primary transmission 542 may be a continuously variable transmission. It is understood that the primary transmission 542 may be fitted with a sensor (not shown) in communication with the controller 530.

The secondary transmission 570 is a continuously variable transmission. A transmission input 572 is drivingly engaged with the second end portion of the intermediate member 540. A transmission output 574 is drivingly engaged with the axle 510 through a driveshaft 532; however, it is understood that the transmission output 574 may be drivingly engaged with the axle 510 through a gear or another device. In one exemplary, non-limiting example, the secondary transmission 570 is a pulley-belt style continuously variable transmission. The pulley-belt style continuously variable transmission comprises of a pair of variable-diameter pulleys, each shaped like a pair of opposing cones, with a belt running between them. The pulley-belt style continuously variable transmission is conventional and well known in the art. The secondary transmission 570 facilitates greater control over a rotational speed of the power source 504 and when combined with the primary transmission 542, facilitates reducing an amount of "slipping" of the primary clutch 520 and the torque converter of the primary transmission 542. It is understood that the secondary transmission 570 may be fitted with a sensor (not shown) in communication with the controller 530.

A first pulley (not shown) is then connected to the transmission input 572 and a second pulley (not shown) is connected to the transmission output 574. The halves of each pulley are moveable, and as the halves of each of the pulleys are moved towards one another the belt is forced to ride higher on the pulley, effectively making a diameter of the pulley larger. Changing the diameter of the each of the pulleys varies the ratio between the transmission input 572 and the transmission output 574. Making the first pulley diameter smaller and the second pulley diameter larger gives a low ratio (a large number of revolutions of the transmission input 572 produce a small number of output revolutions of the transmission output 574). Alternately, it is understood that the secondary transmission 570 may be another type of continuously variable transmission or that the secondary transmission 570 may be an automatic transmission.

The controller 530 is in communication with the primary clutch 520, the primary transmission 542, and the secondary transmission 570. Further, it is understood that the controller 530 may be in communication with a plurality of sensors (not shown). The controller 530 at least one of receives and sends signals to and from at least one of the primary clutch 520, the primary transmission 542, the secondary transmission 570, and the plurality of sensors.

Figure 6:
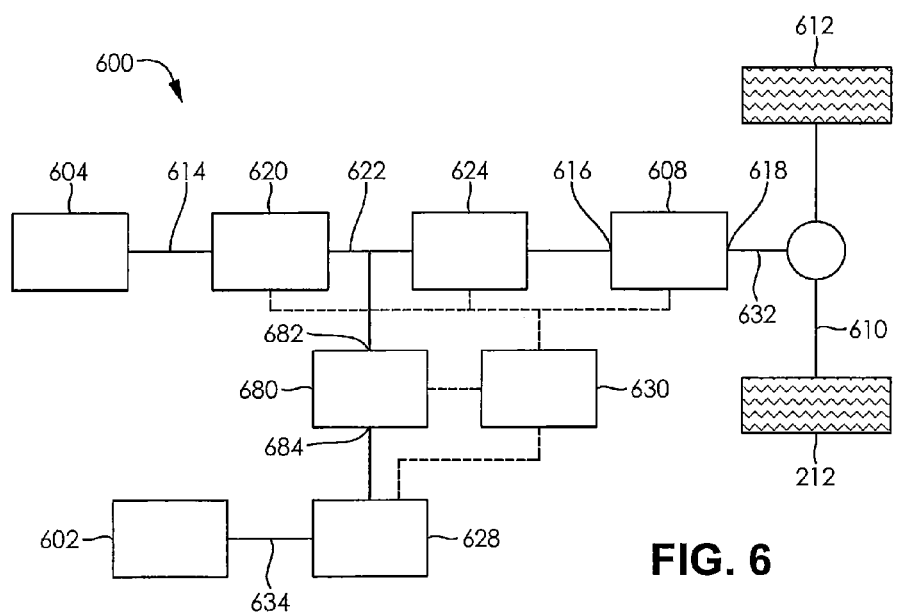
FIG. 6 is a schematic sketch of a vehicle driveline equipped with a flywheel system according to another embodiment of the invention.

FIG. 6 illustrates a vehicle driveline 600 according to another embodiment of the invention. The embodiment shown in FIG. 6 includes similar components to the vehicle driveline 200 illustrated in FIG. 2. Similar features of the embodiment shown in FIG. 6 are numbered similarly in series, with the exception of the features described below.

The vehicle driveline 600 includes a power source 604 having a power source output 614. A primary clutch 620 is drivingly engaged with the power source output 614. A drive member 622 is drivingly engaged with the primary clutch 620 and a secondary clutch 624. A primary transmission 608 is drivingly engaged with the secondary clutch 624. An axle 610 and a pair of wheels 612 are drivingly engaged with the primary transmission 608. A secondary transmission 680 is drivingly engaged with the drive member 622. A flywheel clutch 628 is drivingly engaged with the secondary transmission 680. A flywheel 602 is drivingly engaged with the flywheel clutch 628. A controller 630 is in communication with the primary clutch 620, the secondary clutch 624, the primary transmission 608, the secondary transmission 680, and the flywheel clutch 628.

The secondary transmission 680 is a continuously variable transmission. A transmission input 682 is drivingly engaged with the middle portion of the drive member 622. A transmission output 684 is drivingly engaged with the axle 610 through a driveshaft 632; however, it is understood that the transmission output 684 may be drivingly engaged with the axle 610 through a gear or another device. It is understood that the secondary transmission 680 may be fitted with a sensor (not shown) in communication with the controller 630. In one exemplary, non-limiting example, the secondary transmission 680 is a pulley-belt style continuously variable transmission. The pulley-belt style continuously variable transmission comprises of a pair of variable-diameter pulleys, each shaped like a pair of opposing cones, with a belt running between them. The pulley-belt style continuously variable transmission is conventional and well known in the art. The primary transmission 608 and the secondary transmission 680 facilitate greater control over a rotational speed of the power source 604 and facilitate reducing an amount of "slipping" of the primary clutch 620, the secondary clutch 624, and the flywheel clutch 628.

A first pulley (not shown) is then connected to the transmission input 682 and a second pulley (not shown) is connected to the transmission output 684. The halves of each pulley are moveable, and as the halves of each of the pulleys are moved towards one another the belt is forced to ride higher on the pulley, effectively making a diameter of the pulley larger. Changing the diameter of the each of the pulleys varies the ratio between the transmission input 682 and the transmission output 684. Making the first pulley diameter smaller and the second pulley diameter larger gives a low ratio (a large number of revolutions of the transmission input 682 produce a small number of output revolutions of the transmission output 684). Alternately, it is understood that the secondary transmission 680 may be another type of continuously variable transmission or that the secondary transmission 680 may be an automatic transmission.

The controller 630 is in communication with the primary clutch 620, the secondary clutch 624, the primary transmission 608, the secondary transmission 680, and the flywheel clutch 628. Further, it is understood that the controller 630 may be in communication with a plurality of sensors (not shown). The controller 630 at least one of receives and sends signals to and from at least one of the primary clutch 620, the secondary clutch 624, the primary transmission 608, the secondary transmission 680, the flywheel clutch 628, and the plurality of sensors.

Figure 7:
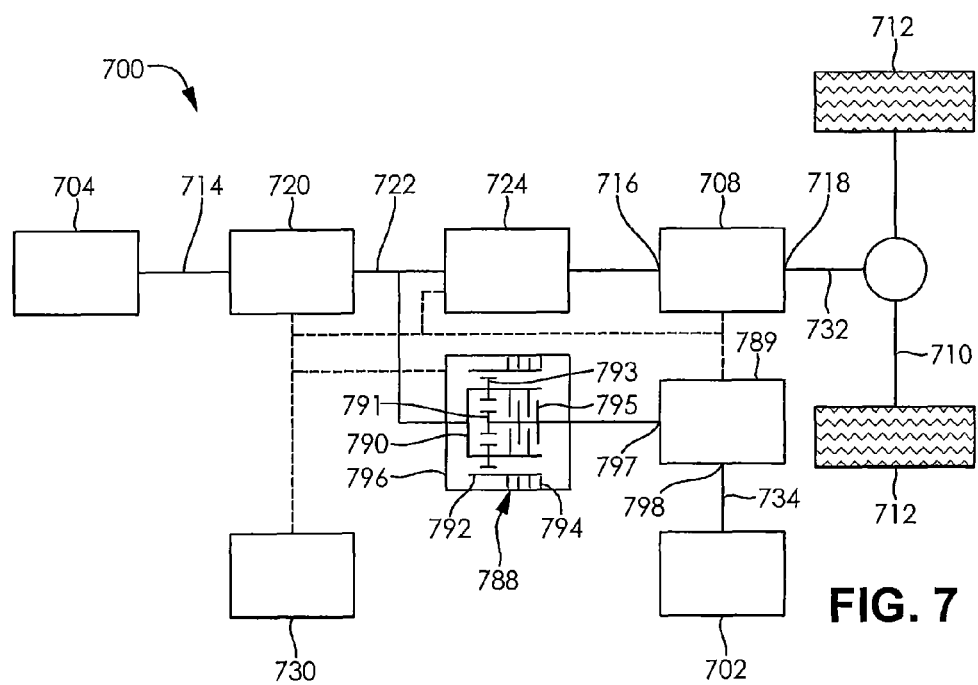
FIG. 7 is a schematic sketch of a vehicle driveline equipped with a flywheel system according to another embodiment of the invention.

FIG. 7 illustrates a vehicle driveline 700 according to another embodiment of the invention. The embodiment shown in FIG. 7 includes similar components to the vehicle driveline 200 illustrated in FIG. 2. Similar features of the embodiment shown in FIG. 7 are numbered similarly in series, with the exception of the features described below.

The vehicle driveline 700 includes a power source 704 having a power source output 714. A primary clutch 720 is drivingly engaged with the power source output 714. A drive member 722 is drivingly engaged with the primary clutch 720 and a secondary clutch 724. A primary transmission 708 is drivingly engaged with the secondary clutch 724. An axle 710 and a pair of wheels 712 are drivingly engaged with the primary transmission 708. A planetary gearset 788 is drivingly engaged with the drive member 222. A secondary transmission 789 is drivingly engaged with the planetary gearset 788. A flywheel 202 is drivingly engaged with the secondary transmission 789. A controller 730 is in communication with the primary clutch 720, the secondary clutch 724, the primary transmission 708, the planetary gearset 788, and the secondary transmission 789.

The primary clutch 720 connects the power source output 714 and the drive member 722. A first portion (not shown) of the primary clutch 720 is drivingly engaged with the power source output 714. A second portion (not shown) of the primary clutch 720 is drivingly engaged with the drive member 722. An actuator (not shown) causes the first portion of the primary clutch 720 to become drivingly engaged with the second portion of the primary clutch 720 when directed by the controller 730. The primary clutch 720 is a friction plate style clutch; however it is understood that other styles of clutches may be used. The primary clutch 720 may be variably engaged to transfer a portion of a torque transferred through the power source output 714 to the drive member 722 or the primary clutch 720 may be variably engaged to transfer a portion of a torque transferred through the drive member 722 to the power source output 714. It is understood that a sensor (not shown) in communication with the controller 730 may be placed on or adjacent the primary clutch 720 to measure an amount of engagement thereof.

The drive member 722 is an elongate member rotatably disposed in a housing (not shown). The drive member 722 includes a first end portion, a second end portion, and a middle portion. The first end portion is drivingly engaged with the second portion of the primary clutch 720. Alternately, it is understood that the first end portion may be unitarily formed with the second portion of the primary clutch 720. The second end portion is drivingly engaged with a first portion (not shown) of the secondary clutch 724. Alternately, it is understood that the second end portion may be unitarily formed with the first portion of the secondary clutch 724. The middle portion extends radially outwardly from a remaining portion of the drive member 722 and includes a plurality of gear teeth formed thereon; however, it is understood that the drive member 722 may be engaged with the planetary gearset 788 in any other manner. The plurality of gear teeth formed on the middle portion is drivingly engaged with the planetary gearset 788. It is understood that a sensor (not shown) in communication with the controller 730 may be placed on or adjacent the drive member 722 to measure a rotational speed thereof.

The secondary clutch 724 connects the drive member 722 and the primary transmission 708. The first portion (not shown) of the secondary clutch 724 is drivingly engaged with the second end portion of the drive member 722. A second portion (not shown) of the secondary clutch 724 is drivingly engaged with the primary transmission 708. An actuator (not shown) causes the first portion of the secondary clutch 724 to become drivingly engaged with the second portion of the secondary clutch 724 when directed by the controller 730. The secondary clutch 724 is a friction plate style clutch; however it is understood that other styles of clutches may be used. The secondary clutch 724 may be variably engaged to transfer a portion of a torque transferred through the drive member 722 to the primary transmission 708 or the secondary clutch 724 may be variably engaged to transfer a portion of a torque transferred through the primary transmission 708 to the drive member 722. It is understood that a sensor (not shown) in communication with the controller 730 may be placed on or adjacent the secondary clutch 724 to measure an amount of engagement thereof.

The primary transmission 708 is a continuously variable transmission. A transmission input 716 is drivingly engaged with the second portion of the secondary clutch 724. A transmission output 718 is drivingly engaged with the axle 710 through a driveshaft 732; however, it is understood that the transmission output 718 may be drivingly engaged with the axle 710 through a gear or another device. It is understood that the primary transmission 708 may be fitted with a sensor (not shown) in communication with the controller 730. In one exemplary, non-limiting example, the primary transmission 708 is a pulley-belt style continuously variable transmission. The pulley-belt style continuously variable transmission comprises of a pair of variable-diameter pulleys, each shaped like a pair of opposing cones, with a belt running between them. The pulley-belt style continuously variable transmission is conventional and well known in the art.

A first pulley (not shown) is then connected to the transmission input 716 and a second pulley (not shown) is connected to the transmission output 718. The halves of each pulley are moveable, and as the halves of each of the pulleys are moved towards one another the belt is forced to ride higher on the pulley, effectively making a diameter of the pulley larger. Changing the diameter of the each of the pulleys varies the ratio between the transmission input 716 and the transmission output 718. Making the first pulley diameter smaller and the second pulley diameter larger gives a low ratio (a large number of revolutions of the transmission input 716 produce a small number of output revolutions of the transmission output 718). Alternately, it is understood that the primary transmission 708 may be another type of continuously variable transmission or that the primary transmission 708 may be an automatic transmission.

The planetary gearset 788 is a transmission device comprising a planet carrier 790, a sun gear 791, a ring gear 792, a plurality of planet gears 793, a ring clutch 794, and a carrier clutch 795. The planet carrier 790, the sun gear 791, the ring gear 792, the plurality of planet gears 793, the ring clutch 794, and the carrier clutch 795 are rotatably disposed in a housing 796. The plurality of planet gears 793 is rotatably disposed on the planet carrier 790. Each of the planet gears 793 is drivingly engaged with the sun gear 791 and the ring gear 792. The ring clutch 794 may be engaged to couple the ring gear 792 to the housing 796. The carrier clutch 795 may be engaged to couple the planet carrier 790 to the sun gear 791, which places the planetary gearset 788 in a locked out condition. Preferably, the planetary gearset 788 is placed in the locked out condition when a rotational speed of the flywheel 702 is low. It is understood that the planetary gearset 788 may be fitted with a sensor (not shown) in communication with the controller 730.

A gear ratio formed between the middle portion of the drive member 722 and the secondary transmission 789 through the planetary gearset 788 facilitates driving engagement between the flywheel 702 and the drive member 722. The primary transmission 708, the secondary transmission 789, and the planetary gearset 788 facilitate greater control over a rotational speed of the power source 704 and facilitate reducing an amount of "slipping" of the primary clutch 620, the secondary clutch 624, the ring clutch 794, and the carrier clutch 795.

The planet carrier 790 is drivingly engaged with the middle portion of the drive member 722 through a plurality of gear teeth formed on an end of the planet carrier 790. The sun gear 791 is drivingly engaged with the secondary transmission 789.

The secondary transmission 789 is a continuously variable transmission. A transmission input 797 is drivingly engaged with the middle portion of the drive member 722. A transmission output 798 is drivingly engaged with the axle 710 through a driveshaft 732; however, it is understood that the transmission output 798 may be drivingly engaged with the axle 710 through a gear or another device. It is understood that the secondary transmission 789 may be fitted with a sensor (not shown) in communication with the controller 730. In one exemplary, non-limiting example, the secondary transmission 789 is a pulley-belt style continuously variable transmission. The pulley-belt style continuously variable transmission comprises of a pair of variable-diameter pulleys, each shaped like a pair of opposing cones, with a belt running between them. The pulley-belt style continuously variable transmission is conventional and well known in the art.

A first pulley (not shown) is then connected to the transmission input 797 and a second pulley (not shown) is connected to the transmission output 798. The halves of each pulley are moveable, and as the halves of each of the pulleys are moved towards one another the belt is forced to ride higher on the pulley, effectively making a diameter of the pulley larger. Changing the diameter of the each of the pulleys varies the ratio between the transmission input 797 and the transmission output 798. Making the first pulley diameter smaller and the second pulley diameter larger gives a low ratio (a large number of revolutions of the transmission input 797 produce a small number of output revolutions of the transmission output 798). Alternately, it is understood that the secondary transmission 789 may be another type of continuously variable transmission or that the secondary transmission 789 may be an automatic transmission.

The controller 730 is in communication with the primary clutch 720, the secondary clutch 724, the primary transmission 708, the planetary gearset 788, and the secondary transmission 789. Further, it is understood that the controller 730 may be in communication with a plurality of sensors (not shown). The controller 730 at least one of receives and sends signals to and from at least one of the primary clutch 720, the secondary clutch 724, the primary transmission 708, the planetary gearset 788, the secondary transmission 789, and the plurality of sensors.

The vehicle driveline 200, 300, 400, 500, 600, 700 facilitates increasing a fuel efficiency of a vehicle the vehicle driveline 200, 300, 400, 500, 600, 700 is incorporated in, permits the power source 204, 304, 404, 504, 604, 704 to be selectively supplemented using the flywheel 202, 302, 402, 502, 602, 702, and permits the flywheel 202, 302, 402, 502, 602, 702 to store and capture excess energy present in the vehicle driveline 200, 300, 400, 500, 600, 700.

In use, the flywheel 202, 302, 402, 502, 602, 702 may be used to supplement the power source 204, 304, 404, 504, 604, 704 of the vehicle driveline 200, 300, 400, 500, 600, 700, which allows the power source 204, 304, 404, 504, 604, 704 to be reduced in capacity, and increases an efficiency of the vehicle driveline 200, 300, 400, 500, 600, 700.

When a power demand of the vehicle driveline 200, 300, 400, 500, 600, 700 is greater than the power source 204, 304,

404, 504, 604, 704 is capable of supplying, the power source 204, 304, 404, 504, 604, 704 is supplemented by engaging the flywheel 202, 302, 402, 502, 602, 702 with the primary transmission 208, 342, 460, 542, 608, 708.

To supplement the power source 204, 504, 604, 704 the flywheel clutch 228, 528, 628, or one of the ring clutch 794 and the carrier clutch 795 are engaged. Energy stored in the flywheel 202, 502, 602, 702 may then be transferred to the drive member 222, 622, 722 or the intermediate member 540 through the ratio adapter 226 or the secondary transmission 570, 680, 789. As mentioned hereinabove, the flywheel clutch 228, 528, 628, or one of the ring clutch 794 and the carrier clutch 795 may be variably engaged to facilitate driving engagement between the flywheel 202, 502, 602, 702 and the drive member 222, 622, 722 or the intermediate member 540 based on at least one of the rotational speed of the power source 204, 504, 604, 704, the flywheel 202, 502, 602, 702, the axle 210, 510, 610, 710, and the drive member 222, 622, 722 or the intermediate member 540. The controller 530, 630, 730 may adjust a drive ratio of the secondary transmission 570, 680, 789 to facilitate driving engagement between the flywheel 502, 602, 702 and the drive member 622, 722 or the intermediate member 540 based on at least one of a power requirement of the vehicle driveline 200, 500, 600, 700, the rotational speed of the power source 504, 604, 704, the flywheel 502, 602, 702, the axle 510, 610, 710, and the drive member 622, 722 or the intermediate member 540.

To supplement the power source 304, 404 the torque converter or other clutching device of the primary transmission 342 or the secondary transmission 344, 444 is engaged. Energy stored in the flywheel 302, 402 may then be transferred to the intermediate member 340, 440 through the secondary transmission 344, 444. As mentioned hereinabove, the torque converter or other clutching device of the primary transmission 342 or the secondary transmission 344, 444 may be variably engaged to facilitate driving engagement between the flywheel 302, 402 and the intermediate member 340, 440 based on at least one of the rotational speed of the power source 304, 404, the flywheel 302, 402, the axle 310, 410, and the intermediate member 340, 440. The controller 330, 430 may adjust a drive ratio of the primary transmission 342 or the secondary transmission 344, 444 to facilitate driving engagement between the flywheel 302, 402 and the intermediate member 340, 440 based on at least one of a power requirement of the vehicle driveline 300, 400, the rotational speed of the power source 304, 404, the flywheel 302, 402, the axle 310, 410, and the intermediate member 344, 444.

The flywheel 202, 302, 402, 502, 602, 702 may also be used to store and capture excess energy present in the vehicle driveline 200, 300, 400, 500, 600, 700, which increases an efficiency of the vehicle driveline 200, 300, 400, 500, 600, 700.

When an amount of energy supplied by the power source 204, 304, 404, 504, 604, 704 is greater than an amount of energy required to operate the vehicle driveline 200, 300, 400, 500, 600, 700, the excess energy present in the vehicle driveline 200, 300, 400, 500, 600, 700 is captured and stored in the flywheel 202, 302, 402, 502, 602, 702. When it is desired that a speed of the vehicle the vehicle driveline 200, 300, 400, 500, 600, 700 is incorporated in is to be reduced, a portion of a kinetic energy of the vehicle may be captured and stored in the flywheel 202, 302, 402, 502, 602, 702 using the vehicle driveline 200, 300, 400, 500, 600, 700.

To capture and store energy in the flywheel 202, 502, 602, 702 when the amount of energy supplied by the power source 204, 504, 604, 704 is greater than an amount of energy required to operate the vehicle driveline 200, 500, 600, 700, the primary clutch 220, 520, 620, 720 is engaged and the flywheel clutch 228, 528, 628, or one of the ring clutch 794 and the carrier clutch 795 is at least variably engaged. Further, the secondary clutch 224, 624, 724 or the torque converter of the primary transmission 542 may be engaged, depending on the amount of energy required to operate the vehicle driveline 200, 500, 600, 700. The drive ratio of the secondary transmission 570, 680, 789 or an engagement level of the flywheel clutch 228 may be adjusted using the controller 230, 530, 630, 730 to increase the rotational speed of the 202, 502, 602, 702 based on at least one of the rotational speed of the power source 204, 504, 604, 704, the flywheel 202, 502, 602, 702, the axle 210, 510, 610, 710, and the drive member 222, 622, 722 or the intermediate member 540.

To capture and store kinetic energy in the flywheel 202, 502, 602, 702 of the vehicle the vehicle driveline 200, 500, 600, 700 when it is desired that the speed of the vehicle be reduced, the primary clutch 220, 520, 620, 720 is disengaged and the flywheel clutch 228, 528, 628, or one of the ring clutch 794 and the carrier clutch 795 is at least variably engaged. Further, the secondary clutch 224, 624, 724 or the torque converter of the primary transmission 542 is at least variably engaged, depending on the amount of energy the flywheel 202, 502, 602, 702 is capable of storing. The drive ratio of the primary transmission 208, 542, 608, 708, the drive ratio of the secondary transmission 570, 680, 789 or an engagement level of the flywheel clutch 228 may be adjusted using the controller 230, 530, 630, 730 to increase the rotational speed of the 202, 502, 602, 702 based on at least one of the rotational speed of the flywheel 202, 502, 602, 702, the axle 210, 510, 610, 710, and the drive member 222, 622, 722 or the intermediate member 540.

To capture and store energy in the flywheel 302, 402 when the amount of energy supplied by the power source 304, 404 is greater than an amount of energy required to operate the vehicle driveline 300, 400, the primary clutch 320, 420 is engaged and the torque converter of the secondary transmission 344, 444 is at least variably engaged. Further, the torque converter of the primary transmission 342 may be engaged, depending on the amount of energy required to operate the vehicle driveline 300. The drive ratio of the secondary transmission 344, 444 or an engagement level of the torque converter of the secondary transmission 344, 444 may be adjusted using the controller 330, 430 to increase the rotational speed of the 302, 402 based on at least one of the rotational speed of the power source 304, 404, the flywheel 302, 402, the axle 310, 410, and the intermediate member 340, 440.

To capture and store kinetic energy in the flywheel 302, 402 of the vehicle the vehicle driveline 300, 400 when it is desired that the speed of the vehicle be reduced, the primary clutch 320, 420 is disengaged and the torque converter of the secondary transmission 344, 444 is at least variably engaged. Further, the torque converter of the primary transmission 342 may be engaged, depending on the amount of energy the flywheel 302, 402 is capable of storing. The drive ratio of the primary transmission 342, 460, the drive ratio of the secondary transmission 344, 444 or an engagement level of the torque converter of the secondary transmission 344, 444 and the torque converter of the primary transmission 342 may be adjusted using the controller 330, 430 to increase the rotational speed of the 302, 402, 602, 702 based on at least one of the rotational speed of the flywheel 302, 402, the axle 310, 410, and the intermediate member 340, 440.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A vehicle driveline, comprising:
    a power source;
    a primary clutch drivingly engaged with the power source;
    a drive member drivingly engaged with the primary clutch and a secondary clutch;
    a primary transmission drivingly engaged with the secondary clutch;
    a planetary gear set drivingly engaged with the drive member;
    a secondary transmission drivingly engaged with the planetary gear set;
    a controller in communication with the primary clutch, the secondary clutch, the primary transmission, the secondary transmission and the planetary gear set; and
    a flywheel drivingly engaged with the secondary transmission, wherein the secondary transmission facilitates a transfer of energy from the flywheel to the drive member through the planetary gear set, and the secondary transmission facilitates a transfer of energy from said drive member to the flywheel through the planetary gear set, the controller directing the transfer of energy to and from the flywheel based on at least one of a state of charge of the flywheel, a power requirement of the vehicle driveline, and a state of operation of the power source;
    wherein the primary transmission is an automatic transmission including a torque converter.

2. The vehicle driveline according to claim 1, wherein the secondary transmission is an automatic transmission, the automatic transmission including a torque converter.

3. The vehicle driveline according to claim 2, wherein the secondary transmission is a ratio adapter, the ratio adapter adjusting a gear ratio formed between the flywheel and one of the power source and the primary transmission.

4. The vehicle driveline according to claim 2, wherein the planetary gear set adjusts a gear ratio formed between the flywheel and one of the power source and the primary transmission planetary gear set, wherein the planetary gear set comprises a planet carrier, a sun gear, a ring gear, and a plurality of planet gears.

5. The vehicle driveline according to claim 4, wherein the planetary gear set further comprises a ring clutch and a carrier clutch, the ring clutch is able to fix the ring gear to a housing in which the planetary gearset is disposed and the carrier clutch is able to fix the planet carrier to the sun gear.

6. The vehicle driveline according to claim 1, wherein the secondary clutch is a torque converter forming a portion of the primary transmission.

7. The vehicle driveline according to claim 1, wherein the secondary clutch is a friction plate style clutch.

8. The vehicle driveline according to claim 1, wherein the primary clutch is a friction plate style clutch.

9. A method of synchronizing a flywheel and a vehicle driveline, comprising the steps of:
    providing a power source;
    providing a primary clutch drivingly engaged with the power source;
    providing a drive member drivingly engaged with the primary clutch and a secondary clutch;
    providing a primary transmission drivingly engaged with the secondary clutch;
    providing a planetary gear set drivingly engaged with the drive member;
    providing a secondary transmission drivingly engaged with the planetary gear set;
    providing a controller in communication with the primary clutch, the secondary clutch, the primary transmission, the secondary transmission and the planetary gear set; and
    providing a flywheel drivingly engaged with the secondary transmission;
    sensing at least one of a state of charge of the flywheel, a power requirement of the vehicle driveline, and a state of operation of the power source; and
    directing a transfer of energy using the controller to and from the flywheel to one of the power source and the primary transmission through the secondary transmission to the flywheel based on at least one of a state of charge of the flywheel, a power requirement of the vehicle driveline, and a state of operation of the power source;
    wherein the primary transmission is an automatic transmission including a torque converter.

10. The method according to claim 9, wherein said planetary gear set comprises a carrier clutch to couple a planet carrier to a sun gear to put the planetary gear set in a lock out condition.

11. The method according to claim 10, wherein said planetary gear set is placed in said lock out condition at a predetermined rotational speed of said flywheel.

12. The method according to claim 9, wherein one of a ring clutch or a carrier clutch in said planetary gear set are engaged to provide rotational power from said flywheel to said drive member.

13. The method according to claim 9, wherein said controller adjusts a drive ratio of the secondary transmission for engagement between the flywheel and the drive member.

\* \* \* \* \*